UNITED STATES PATENT OFFICE.

CARLETON ELLIS, OF MONTCLAIR, NEW JERSEY, ASSIGNOR TO CHADELOID CHEMICAL COMPANY, A CORPORATION OF WEST VIRGINIA.

PAINT OR VARNISH REMOVER.

1,118,482. Specification of Letters Patent. Patented Nov. 24, 1914.

No Drawing. Application filed March 22, 1912. Serial No. 685,612.

*To all whom it may concern:*

Be it known that I, CARLETON ELLIS, of Montclair, Essex county, New Jersey, have made certain new and useful Inventions Relating to Paint or Varnish Removers, of which the following is a specification.

This invention relates to paint or varnish removers and relates especially to removers containing solvent material of a generally ketonic character, such as pinacolins and condensation products of the higher ketones and containing six carbon atoms which are specially desirable for the solution or softening of shellac or other varnish material.

In the manufacture of acetone, calcium acetate is generally employed as a raw material and the commercial processes produce a considerable proportion of oily body as well as the acetone desired. This oily material may be separated from the acetone by agitation with water which absorbs the acetone and similar water-soluble ketones, leaving the other materials in a separated condition. This residual oily material comprises pinacolins and condensation products of the higher ketones. This material may be deodorized, that is, deprived of its disagreeable odor to a considerable extent when used for removers by treatment with metallic sodium or similar material which seems to combine with these substances to form polymeric bodies which are solid at ordinary temperatures and which may be more readily separated from the liquid components by distillation. Metallic sodium also seems to reduce certain unsaturated compounds by virtue of the nascent hydrogen which is liberated when the metal comes in contact with these organic bodies. The saturated bodies resulting have very much less odor than the unsaturated bodies from which they are formed. After this deodorizing process and distillation of the treated material the ketonic condensation products comprising pinacolins and allied bodies may be used in preparing paint or varnish removers either alone or in conjunction with loosening finish solvent material, that is solvents having a generally alcoholic character or action in removers and comprising various alcoholic or ketonic bodies; and in conjunction with suitable penetrating finish solvent material, that is solvents having a generally benzolic character or action in removers, such as benzol, its homologues or other wax solvents. It is understood, of course, that stiffening materials, such as wax, wood flour, whiting, infusorial earth and the like may also be used to increase the consistency of the compound.

Other ketonic condensation products having six carbon atoms and allied to the pinacolins are suitable Ethyl propyl ketone $C_2H_5COC_3H_7$ is obtained by the distillation of a mixture of propionate and butyrate of lime; its boiling point is 122–124° C. Methyl butyl ketone $CH_3CO(CH_2)_3CH_3$ is obtained when distilling calcium butyrate; its boiling point is 127°. Methyl brom butyl ketone $CH_3COCH_2CH_2CH_2CH_2Br$ is an illustrative halogenated derivative of the boiling point of 214° C. at 718 mm. Methylethylacetone $CH_3COCH(CH_3)C_2H_5$ having the boiling point of 118° C., has a peppermint like odor. Ethyl-isopropylketone, $C_2H_5COCH(CH_3)_2$ has the boiling point of 114° C. Methylisobutyl ketone $CH_3COCH_2CH(CH_3)_2$, having the boiling point of 115° at 745 mm., has a strongly camphoric odor. Methyl bromisobutyl ketone $CH_3COCH_2CH(CH_3)CH_2Br$ is a viscous liquid, having the boiling point of 135°–140° C. at 100 mm. 1-hydroxy-5-ketohexane (sometimes called acetylbutyl alcohol) $CH_3COCH_2CH_2CH_2CH_2OH$ has the boiling point of 226° at 760 mm. Methyl-dehydrohexone is an anhydrid of the preceding compound and has the boiling point of 109°. Chlormethylacetobutyl-carbonol $CH_2Cl.CH(OH)CH_2CH_2COCH_3$ has the boiling point of 115° C. at 20 mm. 4-hydroxy-2-keto-4-methylpentane, also called diacetone alcohol $CH_3.CO.CH_2C(CH_3)_2OH$ has the boiling point of 163–5° C. 5-hydroxy-2-keto-4-methylpentane also sometimes briefly spoken of as acetylisobutyl alcohol, $CH_3COCH_2CH(CH_3)CH_2OH$ has the boiling point of 140° at 100 mm.. Mesityl oxid (isopropylidene acetone) 2-methyl-2-pentenone $(CH_3)_2C:CH.CO.CH_3$ having the boiling point of 130° C. smells like peppermint. Mesityl oxid dibromid $C_6H_{10}OBr_2$ is a heavy oil. Allyl acetone, 1.5-hexenone $CH_3.CO.CH_2.CH_2.CH:CH_2$, has the boiling point of 128–130° C. Methyltetramethyleneketone

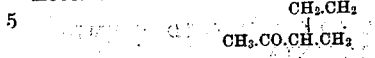

has a peppermint odor and boils at 134° at 738 mm. Acetyltetramethylene $C_6H_{10}O$ has the boiling point of 109–110° C. and smells like camphor. Methyl-3-keto-pentamethylene has the boiling point of 143° C. and the formula

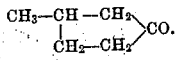

An anhydrid of hexanol-1-on-5 is

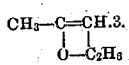

Methyl-2-4-pentenone is $CH_3COC(CH_3):CHCH_3$. Dichlorhexanone is $C_6H_{10}OCl_2$.

An illustrative remover of this character may be prepared according to the following formula: Higher ketonic condensation products, preferably deodorized as indicated, 10 parts, chlorbenzol 5 parts, benzol 3 parts, light kerosene 2 parts, ceresin wax or similar waxy bodies, 1 part, wood flour 7 parts. Another illustrative remover of this character may contain higher ketonic condensation products, such as the pinacolins derived from acetone as described, 12 parts, benzol 3 parts, ceresin wax 1 part. Still another illustrative remover which may be used, if desired, for dipping or tank work may contain higher ketone condensation products 15 parts, kerosene, about 120°, 6 parts, paraffin wax, if desired, ½ part. It is, of course, understood that the proportion of the stiffening material may be varied considerably according to the class of work in which the remover is to be used, and it is not necessary in all cases to use the wax or other stiffening material. Furthermore, the benzol and other wax solvent ingredients may in some cases be omitted, for instance, where the remover is intended solely for use on varnish coatings.

Having described the invention in this case which contains subject-matter taken from my copending application, Serial No. 358,101, filed February 18, 1907 in connection with a number of illustrative proportions, compositions, steps and orders of preparation, to the details of which disclosure the invention is not of course to be limited, what is claimed is:

1. The paint or varnish remover comprising liquid finish solvent higher ketone condensation products containing six carbon atoms and incorporated miscible penetrating finish solvent material, loosening finish solvent material and waxy evaporation-retarding stiffening material.

2. The finish remover comprising a considerable proportion of a liquid finish solvent ketone condensation product containing six carbon atoms and a miscible liquid finish solvent comprising a penetrating finish solvent and incorporated waxy stiffening material.

3. The finish remover comprising a considerable proportion of a liquid finish solvent higher ketone having six carbon atoms and incorporated miscible liquid finish solvent material comprising a loosening finish solvent and incorporated waxy stiffening material.

4. The finish remover comprising a considerable proportion of a liquid finish solvent higher ketone having six carbon atoms and incorporated miscible liquid finish solvent material and incorporated waxy stiffening material.

CARLETON ELLIS.

Witnesses:
JESSIE B. KAY,
JAMES N. CATLOW.